(12) United States Patent
Dalke

(10) Patent No.: US 10,111,408 B2
(45) Date of Patent: Oct. 30, 2018

(54) CINCHING DOG COLLAR AND LEASH

(71) Applicant: Shawna Marie Dalke, Loveland, CO (US)

(72) Inventor: Shawna Marie Dalke, Loveland, CO (US)

(*) Notice: Subject to any disclaimer, the term of this patent is extended or adjusted under 35 U.S.C. 154(b) by 3 days.

(21) Appl. No.: 15/168,078

(22) Filed: May 29, 2016

(65) Prior Publication Data

US 2017/0339922 A1    Nov. 30, 2017

(51) Int. Cl.
*A01K 27/00* (2006.01)

(52) U.S. Cl.
CPC .......... *A01K 27/003* (2013.01); *A01K 27/001* (2013.01)

(58) Field of Classification Search
CPC ............................. A01K 27/003; A01K 27/001
See application file for complete search history.

(56) References Cited

U.S. PATENT DOCUMENTS

| | | | | |
|---|---|---|---|---|
| 2,458,489 A * | 1/1949 | Hallander | ............ | A01K 27/001 119/793 |
| 5,317,989 A * | 6/1994 | Swanson | ............... | A01K 27/003 119/792 |
| 7,243,615 B1 * | 7/2007 | Hendrie | ............... | A01K 27/001 119/792 |
| 2006/0081197 A1 * | 4/2006 | Kuykendall | ......... | A01K 27/005 119/792 |
| 2011/0083616 A1 * | 4/2011 | Elkins | ...................... | A01K 1/04 119/792 |
| 2015/0250144 A1 * | 9/2015 | Lin | ...................... | A01K 27/001 119/792 |

* cited by examiner

*Primary Examiner* — Daniel J Colilla

(57) ABSTRACT

A dog collar and leash that incorporates a cinching mechanism located on opposite and parallel sides of a dog's neck, to allow a person to have better control while walking a dog while minimizing the potential for discomfort to the dog.

8 Claims, 2 Drawing Sheets

CINCHING DOG COLLAR AND LEASH

FIELD OF THE INVENTION

The present invention relates generally to a dog collar and leash, and more particularly, to a dog collar and leash that incorporates a collar cinching mechanism and double leash to allow a person to have better control while walking a dog while minimizing the potential for discomfort to the dog.

BACKGROUND OF THE INVENTION

The present invention comprises dog collar/leash combination preferably made from nylon, designed to assist a dog walker to control a dog that pulls, in order to make the walk more enjoyable for both the dog and the dog walker.

The invention incorporates several unique features to accomplish its purpose. The invention has a double leash with a sturdy, comfortable, plastic handle. This double leash which is attached to opposing sides of the dog's neck is what gives the invention a unique look, as well as being immeasurably effective in walking dogs that pull or have stability issues.

The present invention substantially lessens the problems caused when walking a dog that pulls excessively. The invention utilizes a symmetrical double leash that assists the dog walker by lessening the tug force or torque of the pulling dog and it also keeps the dog from pulling as hard. The collar includes a unique snug & release mechanism that allows the dog to self-regulate its pulling, rather than the dog walker having to use their own tug force over and over to control the dog. The end result is less injuries to dogs and humans, as well as making it a pleasure to walk your dog.

By requiring less tug force on the shoulder, neck, arm and back, the dog walker can avoid injuries and subsequent therapy or surgeries that might be required to heal those injuries from a typical leash/collar combination, which makes walking a difficult dog much easier because there is less work involved.

With less tug force exerted on a dog's neck, throat and spine, injuries are less likely and dogs will enjoy their walks more and will be more likely to focus on their owner as opposed to trying to get away.

DESCRIPTION OF THE INVENTION

The invention uses two mechanisms in order to accomplish this: 1) a double leash with a handle, which enables dog walkers to experience minimal torque to their arm, shoulder, back, and neck and which also gives symmetrical support to the dog's head, neck and spine; and 2) a two-part collar with a very wide nylon webbing so there is no pain, injury or discomfort to the dog's throat and neck. The invention is designed to work for people with dogs that:

pull on their leash during a walk;

have stability issues, such as twirling or dodging off to chase another animal; or try to back out of their collar.

The invention has two unique mechanisms to control a dog and to lessen the pressure on the dog walker; a double leash with a handle and a "snug & release" collar. The mechanism is shown in the attached drawings.

The double leash is connected on or near the half-way point on either side of the dog's neck and works like the reins on a horse bridle. It is easier to control an animal by the use of two reins versus one and it also cuts in half the amount of torque or tug force on the dog walker. The double leash gives symmetrical pressure to the dog's neck, thereby giving better communication, double or more the control of a single leash and alleviates injuries to the dog and human.

The snug & release collar has two halves; a top and a bottom half. The bottom half is very wide and comfortable for the dog. It also gives support for the dog's head to remain lifted and pointing straight forward. The top half of the collar is connected to the double leash. When the dog pulls, the top half of the collar slides through the rings attached to the bottom half of the collar and cinches the collar tight on the dog's neck. Once the dog has stopped pulling, the top half of the collar instantly releases its pressure on the dog's neck by sliding back through the rings. Further, when a dog tries to back out of the collar, the collar will tighten down regardless of whether the dog pulls forward or backward thereby preventing the dog from escaping. The dog, not the dog walker, controls whether the collar is tightened or released. After several attempts, the dog will likely learn that it is up to him to give himself the relief and learns the sweet spot that gives the release.

One of the preferred features of the invention is the wide bottom portion of the collar. Rather than exerting pain to control a dog, this part of the collar provides comfort and support so that the dog will enjoy its walks more and can focus on the dog walker rather than trying to get away.

The invention also includes two D-rings which functions as tether loops. These tether loops can be found on the inside straps of the double leash. The tether loop function is to allow a dog walker to tether their dog on the leash when stopping by their favorite coffee shop or to the grocery store. To use this feature, a swivel snap is unclipped from one side of the collar so that one end of the leash is wrapped around a pole, bicycle rack etc. and the swivel snap is refastened to the tether loop for securing the dog. The tether loop can also be used to carry light items such as a key or poop bag. The collar and leash can be constructed simply using an industrial-type sewing machine. The inventor currently calls the invention the "Cinch Walk".

In order to use the Cinch Walk a dog walker would:

Slide the tri-glide buckle which is located on the lower portion of the dog collar, in order to loosen the collar to its widest setting;

Slip the collar over the dog's head making sure that the lower (wide) portion of the collar is underneath the dog's neck and the upper (narrow) portion of the collar is on the back of the neck;

Slide the tri-glide buckle on the lower portion of the dog collar until the collar is snug;

Check the collar to ensure that the fasteners are located parallel and opposite each other on the sides of the dog's neck;

Using the swivel snaps, attach the double leash to the plastic loops located on either side of the upper portion of the collar;

Lengthen or shorten the double leash using the tri-glide buckles located on both sides so that the dog remains within a comfortable and controllable distance for the dog walker;

If tethering is required, the dog walker may disconnect one of the swivel snaps, wrap it around the tethering post and reconnect it to its original plastic loop on the collar or the walker may just reconnect it to the tether loop if a longer leash is desired;

To remove the collar, the walker must loosen the tri-glide buckle on the lower portion of the collar and slide forward over the dog's head. It is not necessary to remove the double leash when placing and removing the Cinch Walk.

The preferred embodiment of the invention would include a collar with two nylon webbing pieces adjoined with reducing loops. The upper portion should be colored nylon and the lower portion should be black nylon. The lower portion of the collar has a tri-glide buckle for adjustment and should be two inches wide for encouragement of the dog to lift head and for comfort of the dog's neck. The lower portion of the collar connects to the upper portion of the collar via reducing loops. The upper portion of collar should be one inch wide in order to slide through the upper portion of the reducing loops already connected to the lower portion of the collar. The upper portion of collar has D-rings attached to each end for connecting to the double-strap leash swivel snaps. The double-strap leash should have a five-inch hard plastic handle connected to a one-inch nylon webbing that extends from either end of the handle. The two nylon webbing straps that extend from the handle should each a have tri-glide buckle that can be adjusted according to the distance desired between the height of the dog's neck and the hand's reach of the dog walker. Each of the two leash straps should include a swivel snap attached to their ends for connecting to the D-rings which are attached to both ends of the upper portion of the collar. Tether loops should be attached above the tri-glide buckles on either or both straps of the leash so that one may tether their dog during a walk. Although the invention has been explained in relation to its preferred embodiment, it is to be understood that other possible modifications and variations can be made without departing from the spirit and scope of the invention as hereinafter claimed.

Figure 1:
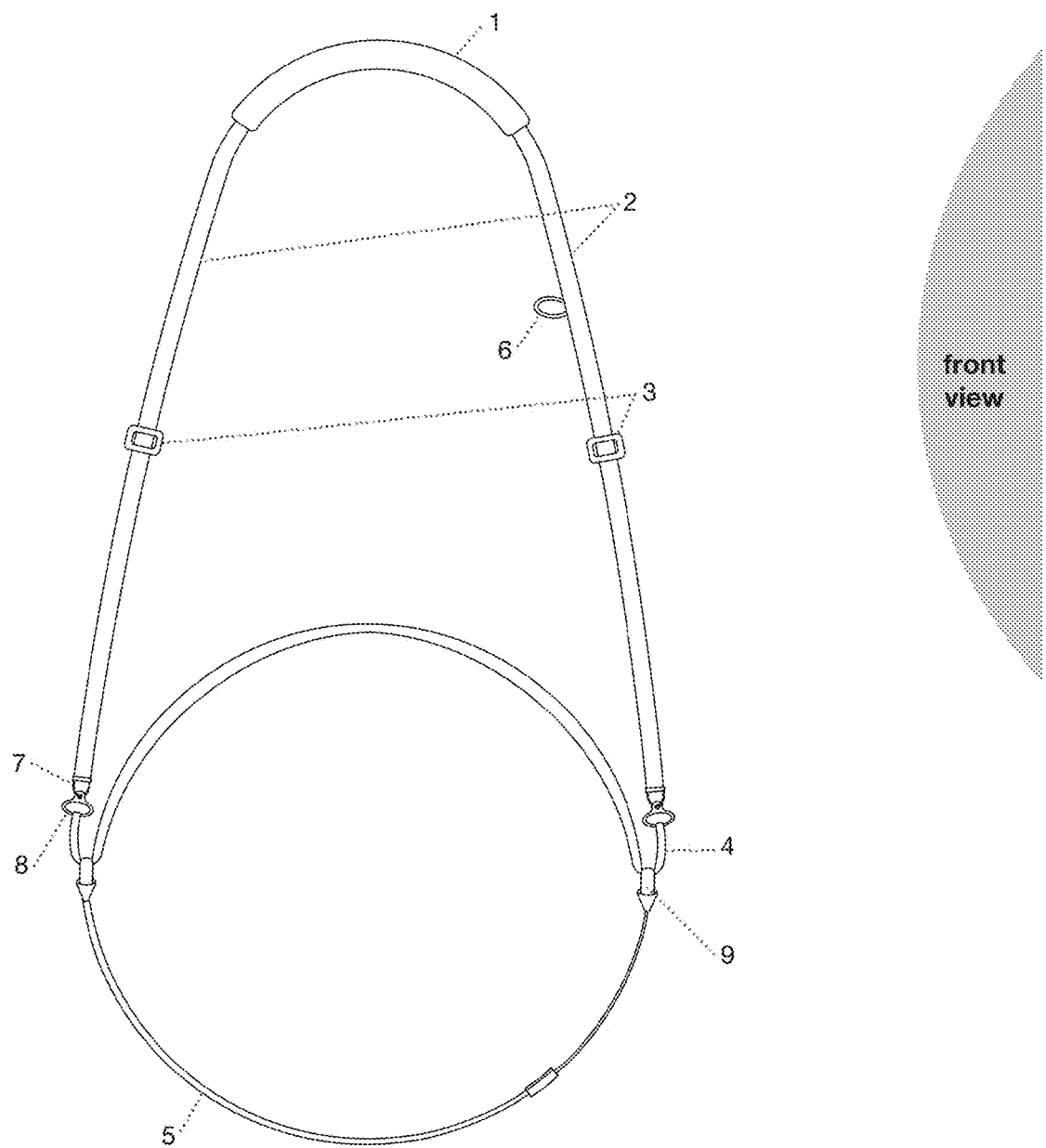
FIG. 1 is a front view of the collar and leash with the following numbered elements:
1. Solid, contoured, hard plastic handle.
2. A nylon double leash is connected on or near the half-way point on either side of the dog's neck.
3. Tri-glide buckles independently shorten and lengthen each side of the double leash according to the size of the dog and height of the dog walker.
4. Top half of the collar is connected to the double leash.
5. Lower portion of collar for comfort and support of the dog's head and neck showing a cam buckle for lengthening and shortening in order to slide the whole collar over the dog's head for fitting and removal.
6. A tether loop so the dog can be tied up using either side of the leash.
7. Swivel snap.
8. Reducing loop.
9. Reducing loop.
Figure 2:
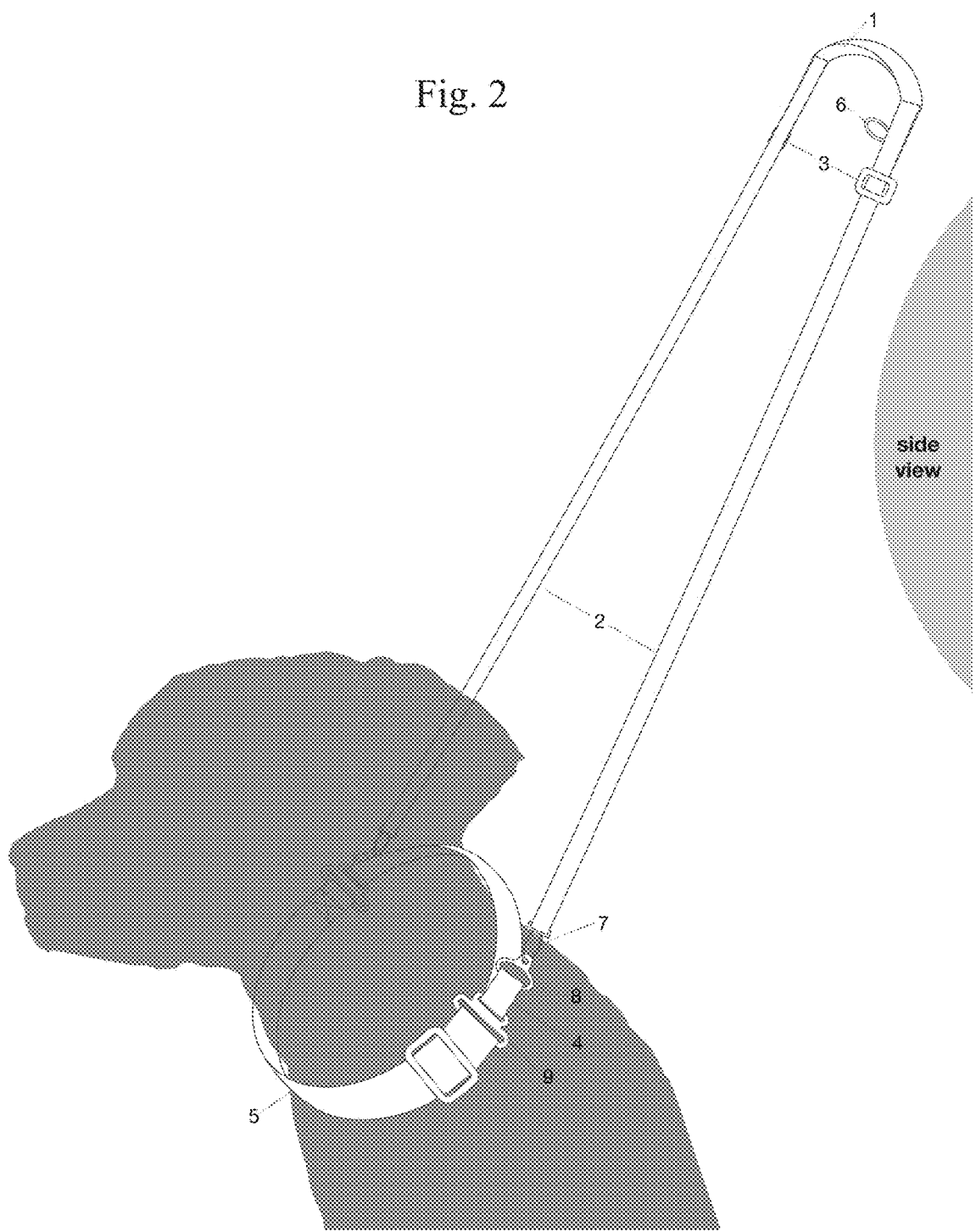
FIG. 2 is a side view of the collar and leash with the following numbered elements:
1. Solid, contoured, hard plastic handle.
2. The nylon double leash is connected on or near the half-way point on either side of the dog's neck.
3. Tri-glide buckles independently shorten and lengthen each side of the double leash according to the size of the dog and height of the dog walker.
4. Top half of the collar is connected to the double leash.
5. Lower portion of collar for comfort and support of the dog's head and neck showing a cam buckle for lengthening and shortening in order to slide the whole collar over the dog's head for fitting and removal.
6. A tether loop so the dog can be tied up using either side of the leash.
7. Swivel snap.
8. Reducing loop.
9. Reducing loop.

What is claimed is:

1. An integrated animal collar and double-strap lead device comprising:
a collar to be removably placed around the neck of an animal,
the collar having a throat strap with a first end and a second end, with
said first end connected to a large eye of a first reducing loop, and
said second end of said throat strap threaded through a slide buckle and extended through a large eye of a second reducing loop,
the collar having an upper neck strap received against the back of the animal's neck opposite said throat strap, said upper neck strap having a first end and a second end,
said first end of said upper neck strap threaded through a small eye of said first reducing loop, and connected to a first ring,
said second end of said upper neck strap threaded through a small eye of said second reducing loop, and connected to a second ring; and
an elongated lead with a first strap and a second strap, said first strap having a first end and a second end and said second strap having a first end and a second end,
a handle grip with a first end and a second end, said handle grip said first end permanently connected to said first strap said second end, and said handle grip said second end permanently connected to said second strap said second end,
said first strap said first end threaded through a first lead slide buckle and connected to a first end of a first swivel snap,
said first swivel snap having a first end and a second end, said second strap said first end threaded through a second lead slide buckle and and connected to a first end of a second swivel snap,
said second swivel snap having a first end and a second end.

2. The integrated animal collar and double-strap lead device of claim 1, wherein the lead further includes a ring statically attached below the handle grip, but above one of said lead slide buckles, on one or another of said first and second straps.

3. The integrated animal collar and double-strap lead device of claim 1, wherein said first swivel snap second end and said second swivel snap second end are independently coupled to the respective first and second rings which are respectively attached to the first end and the second end of the upper neck strap wherein the first and second swivel snaps extend outwardly from the upper neck strap.

4. The integrated animal collar and double-strap lead device of claim 1, wherein the collar slide buckle and the lead first strap and second strap slide buckles are tri-glide buckles.

5. The integrated animal collar and double-strap lead device of claim 1, wherein the first and second reducing loops are retainer/reducer loops which downsize 2" webbing of the throat strap to 1" webbing of the upper neck strap.

6. A combination animal collar and double-strap lead device, comprising:
a collar to be removably placed around the neck of an animal,
the collar having a throat strap with a first end and a second end, with said first end connected to large eye of a first reducing loop, and said second end of said throat strap threaded through a slide buckle and extended through a large eye of a second reducing, the collar having an upper neck strap received against the back of the animal's neck opposite said throat strap, said upper neck strap having a first end and a second end, said first end of said upper neck strap threaded through a small eye of said first reducing loop, and connected to a first ring, said second end of said upper neck strap threaded through a small eye of said second reducing loop, and connected to a second ring, a double-strap lead connected to said first ring and said second ring of said upper neck strap and extending outwardly therefrom; and said double-strap lead including a first strap and a second strap, said first strap having a first end and a second end and said second strap having a first end and a second end, a handle grip with a first end and a second end, said handle grip said first end permanently connected to said first strap said second end, and said handle grip said second end permanently connected to said second strap said second end, said first strap said first end threaded through a first lead slide buckle and and connected to a first end of a first swivel snap, said first swivel snap having the first end and a second end, said second strap said first end threaded through a second lead slide buckle and and connected to a first end of a second swivel snap, said second swivel snap having the first end and a second end, said first swivel snap said second end connected to said first ring of said upper neck strap and said second swivel snap said second end connected to said second ring of said upper neck strap and extending outwardly therefrom, thereby providing equal control by maintaining said first ring and said second ring at opposite sides of the animal's neck during stress imposed upon collar.

7. The combination animal collar and double-strap lead device of claim 6, wherein said double-strap lead is impermanently connected to said first and second rings of said upper neck strap of said collar.

8. The combination animal collar and double-strap lead device of claim 6, wherein said first and said second straps are removably connected to said first and second rings of said upper neck strap of said collar.

* * * * *